United States Patent [19]

Shimizu et al.

[11] Patent Number: 5,626,019

[45] Date of Patent: May 6, 1997

[54] GAS TURBINE INTAKE AIR COOLING APPARATUS

[75] Inventors: Akihiro Shimizu, Mito; Motoaki Utamura, Hitachi; Shinichi Hoizumi, Hitachi; Hideaki Komatsu, Hitachi, all of Japan

[73] Assignee: Hitachi, Ltd., Tokyo, Japan

[21] Appl. No.: 329,082

[22] Filed: Oct. 25, 1994

[30] Foreign Application Priority Data

Oct. 29, 1993 [JP] Japan .................................. 5-271552

[51] Int. Cl.⁶ .............................................. F02C 1/00
[52] U.S. Cl. ........................ 60/728; 60/39.465; 60/736
[58] Field of Search ..................... 60/39.461, 39.465, 60/728, 730, 734, 736, 206

[56] References Cited

U.S. PATENT DOCUMENTS

| | | | |
|---|---|---|---|
| 2,322,717 | 6/1943 | Nettel | 60/728 |
| 2,917,903 | 12/1959 | Stineman et al. | 60/736 |
| 3,724,229 | 4/1973 | Seliber | 62/52 |
| 3,978,663 | 9/1976 | Mandrin et al. | 60/728 |
| 4,033,135 | 7/1977 | Mandrin | 60/648 |
| 4,995,234 | 2/1991 | Kooy et al. | 60/648 |
| 5,295,350 | 3/1994 | Child et al. | 60/728 |
| 5,457,951 | 10/1995 | Johnson et al. | 60/728 |

FOREIGN PATENT DOCUMENTS

| | | | |
|---|---|---|---|
| 0027034 | 3/1981 | Japan | 60/728 |
| 0142219 | 6/1989 | Japan | 60/728 |
| 6-22958 | 8/1994 | Japan . | |

Primary Examiner—Timothy Thorpe
Assistant Examiner—Ted Kim
Attorney, Agent, or Firm—Fay, Sharpe, Beall, Fagan, Minnich & Mckee

[57] ABSTRACT

The apparatus for cooling intake air includes a heat exchanger for transmitting the cold energy of fuel to a heat medium through an intermediate heat medium having a different property from the heat medium, a pressure controller for controlling the pressure within the heat exchanger so that a temperature of the intermediate heat medium is kept higher than a solidifying point of the heat medium, and an intake air cooling system for cooling intake air to be introduced into the gas turbine using the heat medium cold energy. The intermediate heat medium may be condensable by the cold energy of the fuel and vaporizable by the heat medium or may have a solidifying point lower than the fuel.

15 Claims, 5 Drawing Sheets

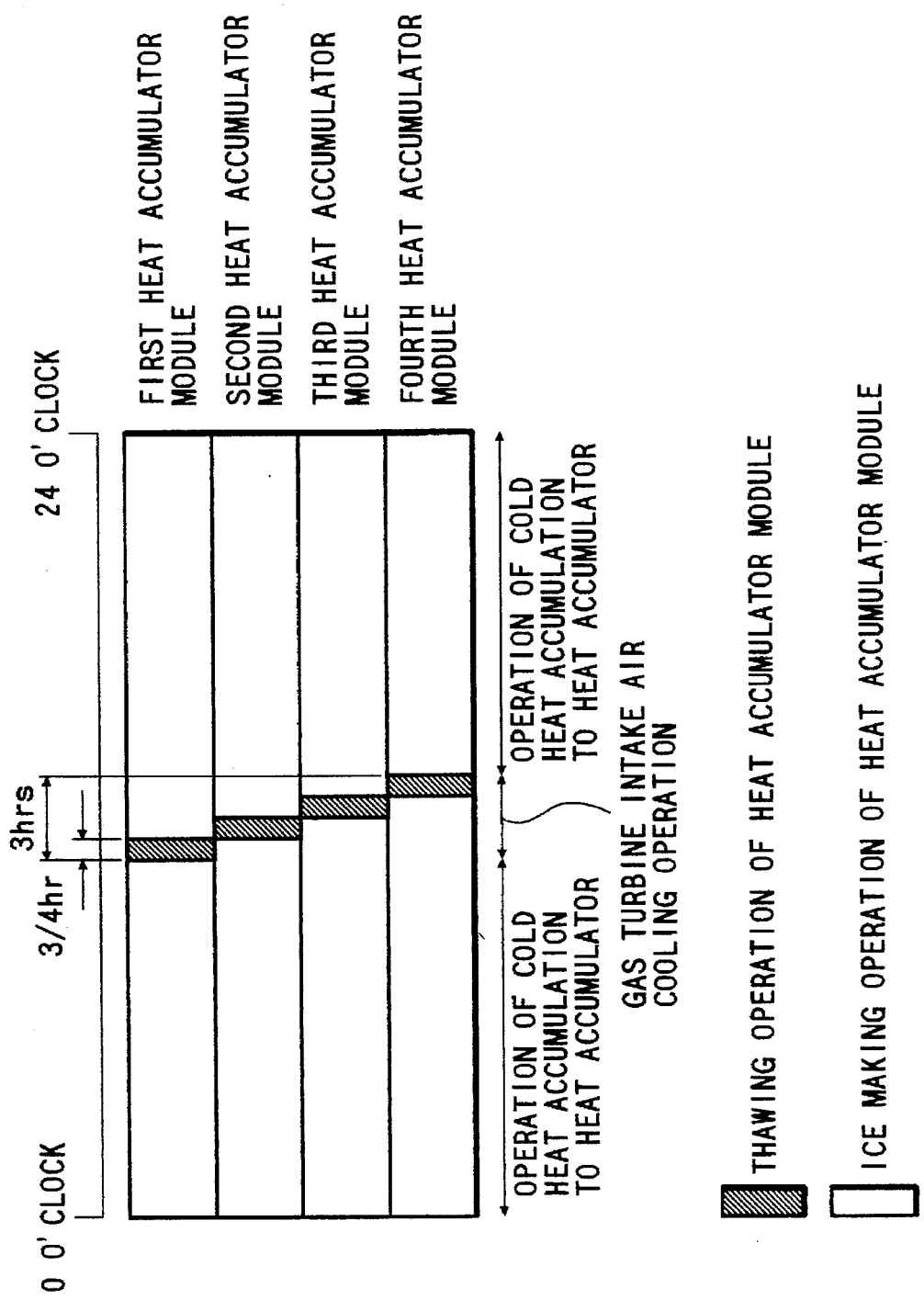

GAS TURBINE INTAKE AIR COOLING APPARATUS

BACKGROUND OF THE INVENTION

The present invention relates to a gas turbine intake air cooling apparatus for cooling gas turbine intake air with fuel for driving the gas turbine such as liquified natural gas (hereunder, referred to as LNG) and to a method of operation of the apparatus.

Recently, combined power plants using gas turbines have increased in ratio of power supply as compared with conventional steam power plants because the former is higher in efficiency than the latter.

Gas turbines each have a construction that a lot of air is taken by a rotary compressor and its output is generated by expanding the air, so that the specific gravity of the air influences greatly on the output. The higher the temperature of the atmosphere becomes, the smaller the specific gravity thereof becomes, and the gas turbine has a characteristic that its output decreases thereof decrease as well. On the other hand, since the peak of electric power demand is in summer, more power is required in summer when the atmosphere temperature is high. This is contrary to the characteristic of the gas turbine. It is necessary to effectively supply electric power without decreasing power generation of the gas turbine even if the atmosphere temperature is high.

According to such a demand, a gas turbine intake air cooling method is proposed, wherein decrease in gas turbine output in summer is prevented by lowering the gas turbine intake air temperature below atmosphere temperature and supplying the intake air lowered in temperature. Japanese Utility-Model Publication No. 61-37794 discloses a method in which LNG cold energy lowers temperature of brine as a heat medium, the brine is brought into direct contact with gas turbine intake air to lower the temperature thereof. Japanese Patent Laid-open Application No. 1-142219 discloses a method in which LNG cold energy lowers a temperature of a heat medium and the heat medium lowered in temperature cools directly gas turbine intake air or indirectly cools the gas turbine intake air using a heat medium. In the laid-open application, water or a mixture of ethylene glycol and water may be used as those heat mediums.

In the above former method using the brine as a heat medium directly in contact with LNG cold energy, the brine is easily frozen because of a temperature difference between a boiling temperature −162° C. of LNG and a solidifying point −22° C. of the brine, which is a bar to recirculation of the brine. The above latter method also has a problem similar to the former method.

Further, since the peak of power demand is in summer, particularly in the daytime of summer, it is desirable to cool gas turbine intake air by using cold energy of a heat accumulator in the daytime thereby to effect heat dissipation operation of the heat accumulator for increasing output of the gas turbine and to effect heat accumulation of LNG cold energy at night because cold for cooling the gas turbine intake air is unnecessary or smaller than in the daytime. However, it is difficult for conventional heat accumulators to carry out a lot of heat dissipation and heat accumulation at the same time because of insufficient capacity of the heat accumulators.

SUMMARY OF THE INVENTION

An object of the present invention is to provide an apparatus for cooling gas turbine intake air by safely using cold energy of fuel such as LNG cold while preventing heat medium from being frozen in a portion not required to freeze.

Another object of the present invention is to provide a gas turbine intake air cooling apparatus which is able to effect a lot of heat dissipation and heat accumulation of a heat accumulator at the same time, and a method of operating the apparatus.

The apparatus for cooling intake air to be taken in a gas turbine using fuel for the gas turbine according to the present invention is characterized in that the cold energy of fuel is transmitted to a heat medium used for cooling intake air for the gas turbine through an intermediate heat medium which has a different property from the heat medium.

In an aspect of the present invention, the intermediate heat medium is condensable by the cold energy of fuel and vaporizable by the heat medium.

In another aspect of the present invention, the intermediate heat medium has a solidifying point lower than the fuel.

In further another aspect of the present invention, the apparatus for cooling intake air to be taken in a gas turbine using fuel for the gas turbine comprises a heat exchanger for transmitting the cold energy of fuel to a heat medium through an intermediate heat medium having a different property from the heat medium, a pressure controller for controlling the pressure within the heat exchanger so that a temperature of the intermediate heat medium is kept higher than a solidifying point of the heat medium, and an intake air cooling system for cooling intake air to be introduced into the gas turbine using the heat medium cold.

In another further aspect of the present invention, the intake air cooling system comprises a heat accumulator having therein a further heat medium for accumulating the heat medium cold in the further heat medium therein, and an intake air cooler for cooling intake air to be introduced into the gas turbine with accumulated cold energy.

In another further aspect of the present invention, the heat accumulator comprises a plurality of heat accumulator modules separated fluidly from each other. Each of the heat accumulator modules has fluid lines for the heat medium with valves for receiving the heat medium cold energy from the heat exchanger and further fluid lines for the further heat medium with valves for transmitting the accumulated cold of the further heat medium to the intake air cooler to cool the intake air. The plurality of heat accumulator modules are operated so that heat accumulation and heat dissipation in at least one of the plurality of heat accumulator modules are switched according to a cold demand required for the intake air cooler.

"Cold energy" used herein means a state of energy of a substance in a lower temperature side than an atmosphere temperature.

BRIEF DESCRIPTION OF THE DRAWINGS

FIG. 7 is a schedule diagram of a heat accumulator module operation in the second embodiment.

DETAILED DESCRIPTION OF EMBODIMENTS OF THE INVENTION

An embodiment (simply referred to a first embodiment) of the present invention is described hereunder with reference to FIGS. 1 to 5.

Figure 1:
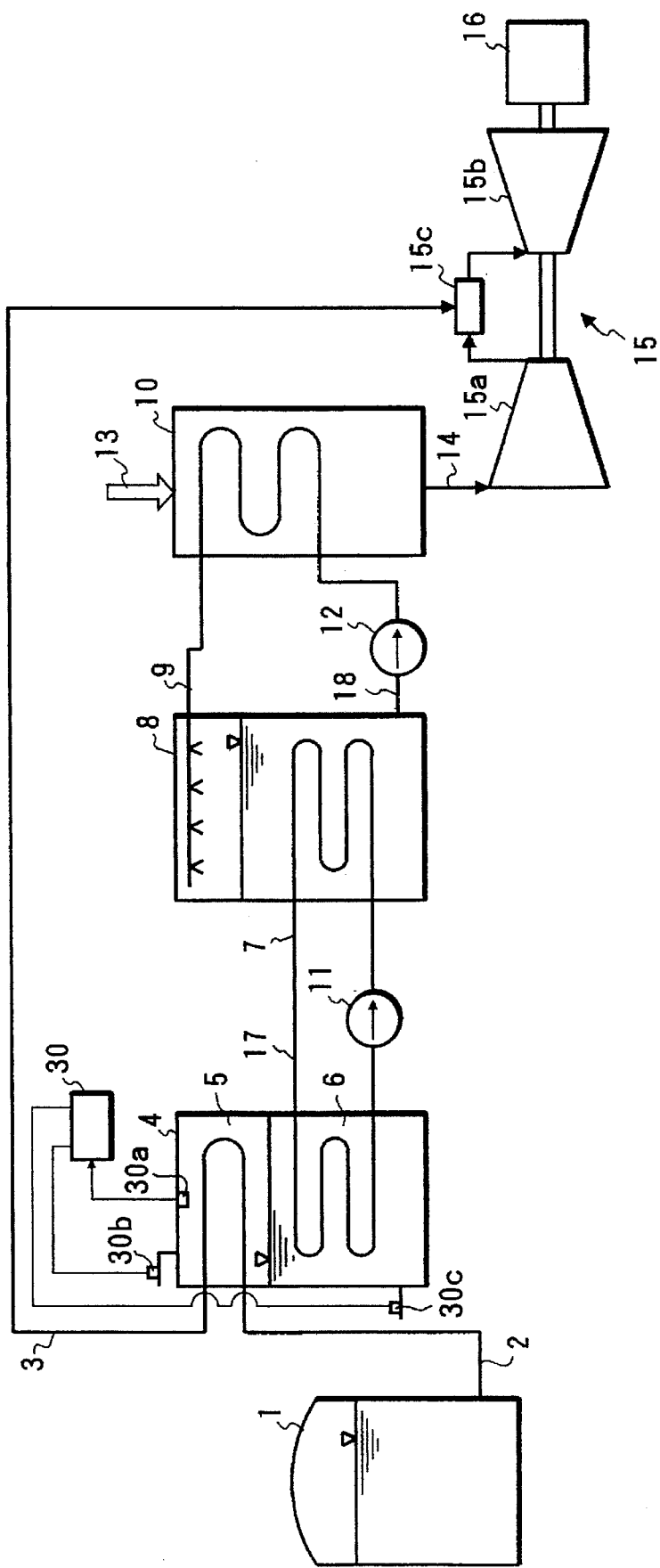
FIG. 1 is a schematic diagram of a gas turbine intake air cooling apparatus of a first embodiment of the present invention.

In FIG. 1, a gas turbine 15 comprises a compressor 15a, a gas turbine part 15b and a combustor 15c. The compressor 15a takes in air to compress and supplies it to the combustor 15c to effect combustion of fuel supplied thereto and mixed with the compressed air to form a combustion product. The combustion product drives the gas turbine part 15b which bears a load 16 such as an electric generator.

Air to be taken or introduced into the compressor 15a, that is, intake air for the gas turbine 15 is cooled with cold energy of fuel and then the cooled intake air is supplied to the gas turbine 15. In this embodiment, LNG is used as a fuel, and LNG cold energy is used for cooling the intake air 13 for the gas turbine 15.

The apparatus for cooling gas turbine intake air of the first embodiment comprises a first heat exchanger 4, a second heat exchanger 8 and an intake air cooler 10. The first heat exchanger 4 is provided with a part of pipe line 3 and a pressure controller 30 and contains therein propane as an intermediate heat medium. Pressure in the inside of the heat exchanger 4 is controlled by the pressure controller 30 to be always constant, so that the propane is separated in two phases, a gas phase 5 and a liquid phase 6 at a saturated temperature corresponding to the controlled pressure. The pipe line 3 is led from a LNG tank 1 containing therein LNG as a fuel to the gas turbine 15 through the first heat exchanger 4. The LNG 2 led to the first heat exchanger 4 is converted therein from liquid phase to a gas phase, with the LNG receiving gasification heat from the propane of gas phase. The vaporized LNG is led to the gas turbine 15 to be served as fuel therefor. The propane 5 of gas phase loses its latent heat through heat exchange with the LNG and turns into propane 6 of liquid phase, that is, propane vapor is condensed.

The second heat exchanger 8 is provided with a spray device at an upper side thereof and contains therein water as a second heat medium. The water is recirculated by a pump 12 provided on a pipe line 9 through the pipe line 9. A part of the pipe line 9 is arranged within the interior of the intake air cooler 10 to contact with an intake air 13 for the gas turbine to cool the air and cooled air is supplied into the gas turbine 15 through an intake pipe 14.

A recirculation line 7 is provided between the first and second heat exchangers 4 and 8 so that a part thereof is disposed in the propane 6 of liquid phase in the first heat exchanger 4 and another part is disposed in the water in the second heat exchanger 8. The recirculation line 7 comprises a looped pipe and a pump 11 mounted on the pipe. Brine 17 as a first heat medium is contained in the pipe and recirculated by the pump 11. The brine entered the first heat exchanger 4 through the second heat exchanger 8 is lowered in temperature by the propane 6 of liquid phase, and the propane 6 receives a heat amount corresponding to a heat amount spent for lowering the brine, as gasification heat, so that the propane 6 is vaporized to be propane 5 of gas phase. These heat relations are shown in FIG. 2.

Figure 2:
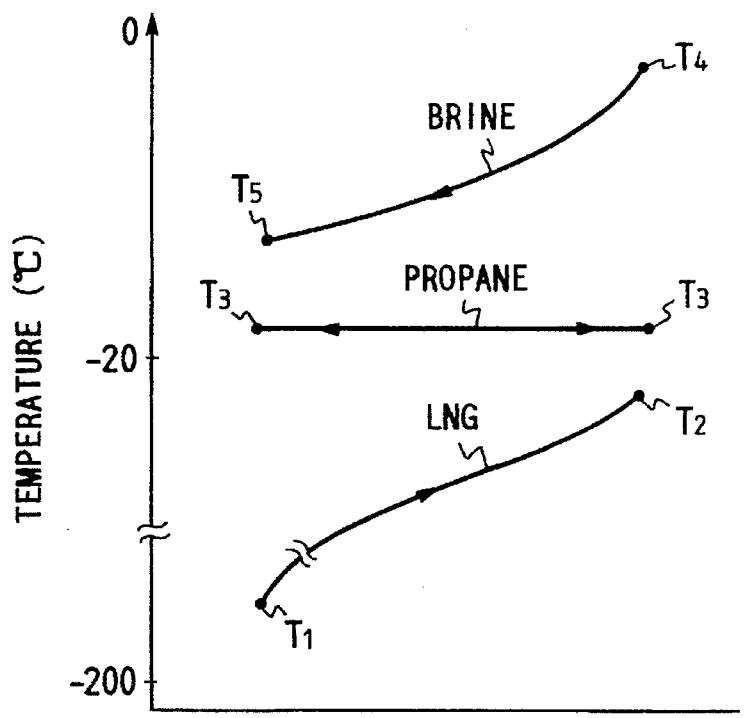
FIG. 2 is a temperature diagram of a first heat exchanger used in the gas turbine intake air cooing apparatus shown in FIG. 1.

In FIG. 2, $T_1$, $T_2$ represent an inlet temperature and an outlet temperature of LNG of the first heat exchanger 4, respectively. $T_3$ represents a working temperature which is a saturation temperature of the propane. $T_4$, $T_5$ represent an inlet temperature and an outlet temperature of the brine at the first heat exchanger 8.

Since boiling temperature of the propane in the first heat exchanger 4 can be raised to a temperature higher than a solidification temperature $-22°$ C. of the brine by controlling the pressure of the propane to a suitable one by the pressure controller 30, the brine can be prevented from being frozen. The pressure controller 30 is provided with pressure sensor 30a, and a valve 30b mounted on a passage for propane of gas phase and/or a valve 30c mounted on a passage for propane of liquid phase. The pressure sensor 30a detects pressure in the first heat exchanger 4, and the pressure controller 30 controls pressure in the first heat exchanger 4 by operation of the valve 30b, 30c so as to introduce or discharge propane of gas phase and/or liquid phase so that the detected pressure will be a target pressure. It is possible to associate feedback control for the pressure control.

Further, since the latent heat of the propane is two or three times the latent heat of LNG or the brine, it is possible to make the size of the first heat exchanger 4 smaller.

Figure 3:
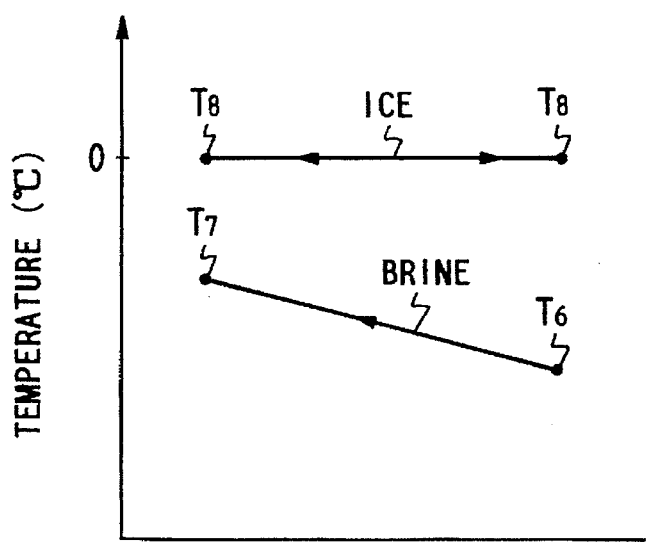
FIG. 3 is a temperature diagram of a heat accumulator used in the gas turbine intake air cooling apparatus shown in FIG. 1.

Further, the brine lowered in temperature in the first heat exchanger 4 by the propane is sent to the second heat exchanger 8 through the recirculation line 7. The water in the second heat exchanger 8 is lowered in temperature and made into ice, so that the second heat exchanger 8 contains therein water and ice. Since there is the propane of intermediate heat medium, a working temperature range of the brine can be approached near a temperature of ice, as shown in FIGS. 2 and 3. By causing the working temperature range of the brine to approach near the ice temperature, it is possible to damp thermal shock of ice-making apparatus and pipings. In FIG. 3, $T_6$, $T_7$ are inlet temperature and outlet temperature of the brine at the second heat exchanger 8, respectively. $T_8$ represents a freezing temperature of water in the second heat exchanger 8.

The water is recirculated in the pipe line 9 between the second heat exchanger 8 and the intake air cooler 10 to lower the temperature of atmosphere or air 13 introduced into the intake air cooler 10. The cooled air is introduced into the gas turbine 15 as an intake air for the gas turbine through the intake pipe 14.

Figure 4:
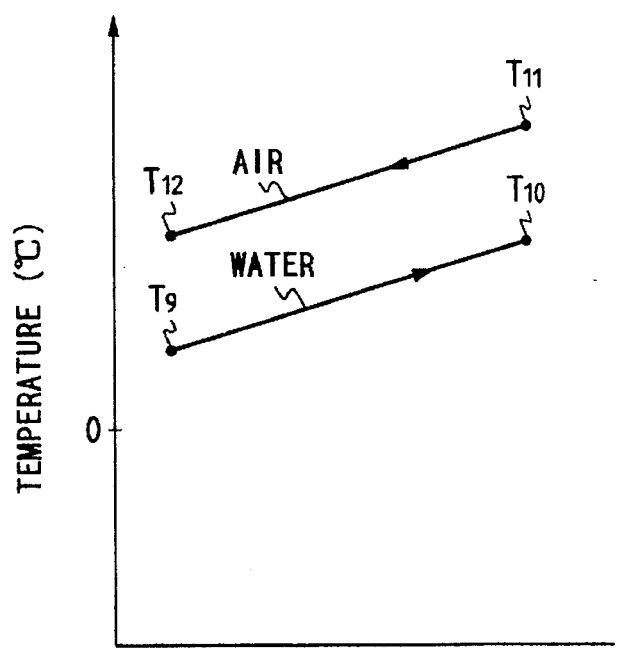
FIG. 4 is a temperature diagram of an intake air cooler used in the gas turbine intake air cooling apparatus shown in FIG. 1.

FIG. 4 shows relations among air temperatures at the inlet and outlet of the intake air cooler 10, water temperature at the outlet of the second heat exchanger 8 and water temperature after heat-exchanging in the intake air cooler 10. $T_9$, $T_{10}$ are the inlet temperature and the outlet temperature of water at the intake air cooler 10, respectively, and $T^{11}$, $T_{12}$ represent the inlet temperature and the outlet temperature of air at the intake air cooler 10, respectively.

Figure 5:
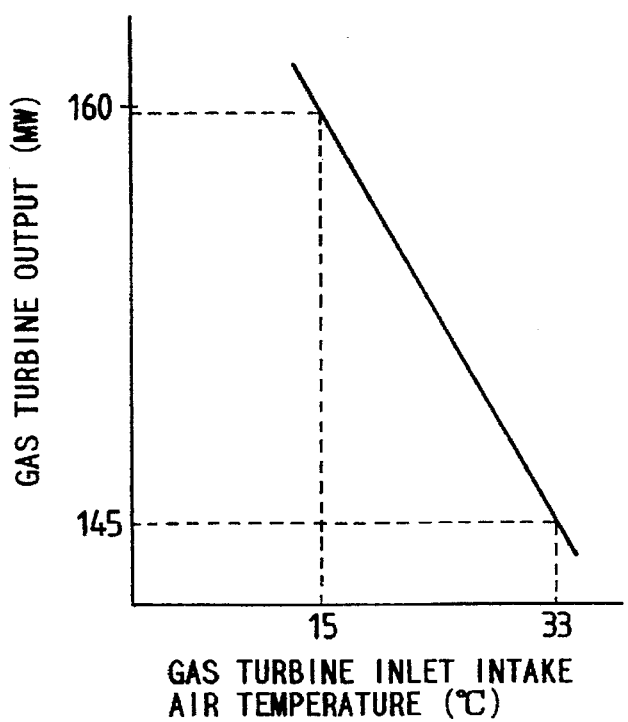
FIG. 5 is a diagram showing a relationship between gas turbine intake air and output of the gas turbine in the first embodiment.

In FIG. 5, in case that the inlet temperature $T_{11}$ of air at the intake air cooler 10 and the outlet temperature $T_{12}$ of the air at the intake air cooler 10 are 33° C. and 15° C., respectively, output of the gas turbine 15 can be increased by about 10%.

As apparent from the above description, the brine cold is accumulated in the second heat exchanger 8 as ice and cold water, so that the second heat exchanger 8 serves as a heat accumulator. Further, the heat accumulator and the intake air cooler constitutes a cooling system for air to be introduced into the gas turbine 15, wherein the heat accumulator is a cold energy source for the intake air cooler 10, and the pipe line 9 is a second recirculation line for recirculating the second heat medium 18.

The propane has a solidifying point of −190° C. which is lower than a solidifying point (−162° C.) of LNG. Methane, ethane, carbon tetrafluoride, etc. can be used for the intermediate heat medium instead of propane. Examples of brine as a first heat medium are calcium chloride water solution, ethylene glycol water solution, propylene glycol water solution, etc..

Figure 6:
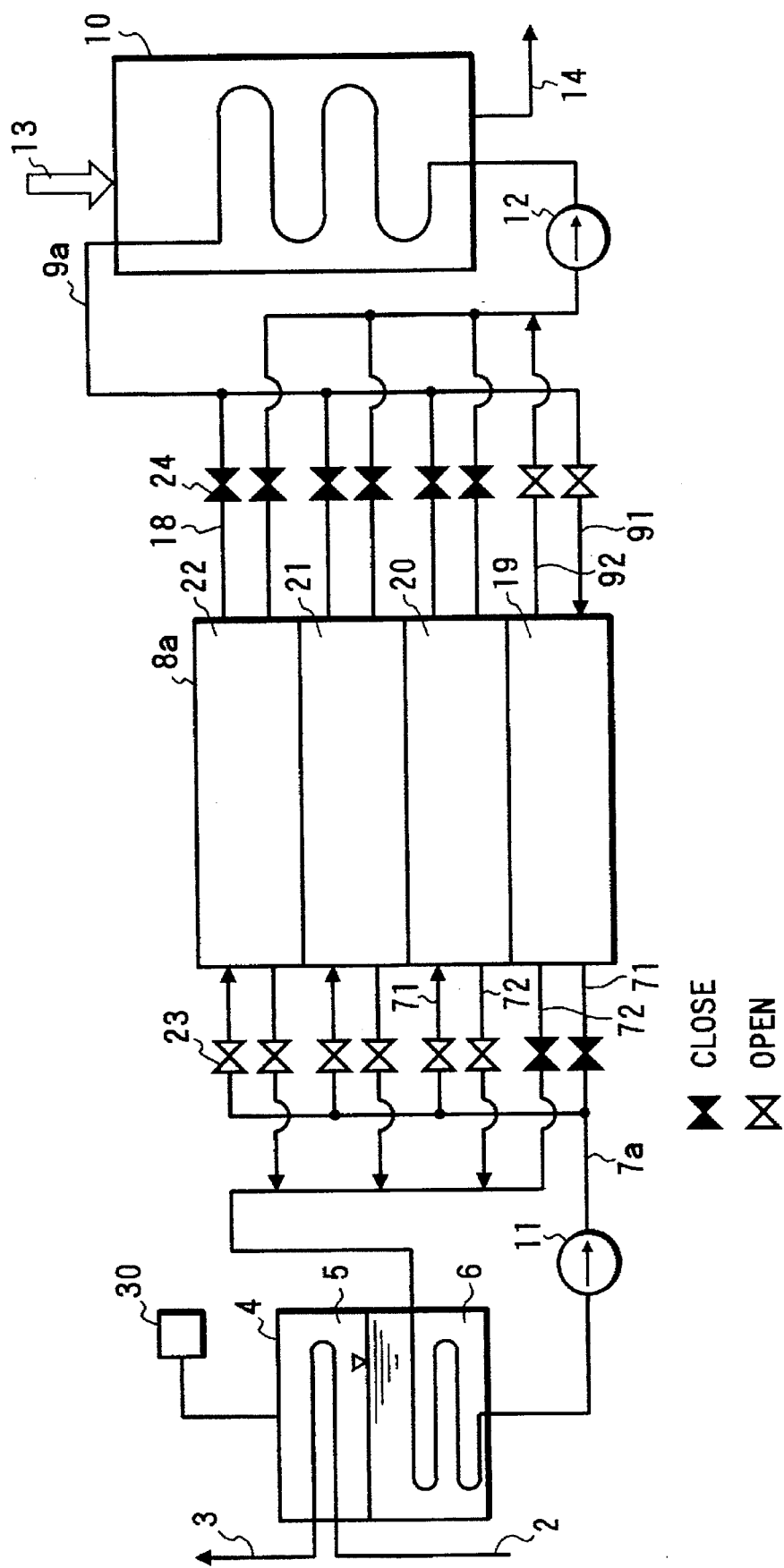
FIG. 6 is a schematic diagram of a gas turbine intake air cooling apparatus of a second embodiment of the present invention.

Another embodiment (second embodiment) is described hereunder, referring to FIGS. 6 and 7.

A principle construction of an apparatus for cooling gas turbine intake air with vaporization heat of LNG as a cold source, in the second embodiment, is the same as one of the first embodiment. However, the second heat exchange 8 of the first embodiment is different from a second heat exchanger 8a of the second embodiment and the difference causes modification of the recirculation lines 7 and 9.

In FIG. 6, the second heat exchanger 8a is a heat accumulator comprising a plurality of heat accumulator modules 19 to 22 fluidly separated from each other, each of which accumulates and dissipates the first heat medium cold recirculating in the recirculation line 7a having branch line parts 71, 72. First to fourth heat accumulator modules 19 to 22 are stacked as shown in FIG. 6. Each heat accumulator module 19 to 22 is connected to the recirculation line 7a through branch line parts 71, 72 each of which has a first flow regulation valve 23 mounted thereon, and to the recirculation line 9a through branch lines 91, 92 each of which has a second flow regulation valve 24 mounted thereon.

An amount of recirculation of the first heat medium for each heat accumulator module 19-22 is determined by flow rate of the pump 11 and opening degree of the first flow regulation valves 23. An amount of recirculation of the second heat medium in each heat accumulator module from the heat accumulator module to the intake air cooler 10 is determined by flow rate of the pump 12 and opening degree of the second flow regulation valves 24.

An example of an operation schedule of the heat accumulator modules 19-22 is shown in FIG. 7. In this example, a gas turbine intake air cooling operation by thawing ice of the second heat exchanger 8a is effected for three hours in the daytime, and ice-making is effected in the second heat exchanger 8a for remaining 21 hours.

Since the second heat exchanger 8a has the four heat accumulator modules 19 to 22, in order to execute ice-thawing operation for three hours, each heat accumulator module executes the ice thawing operation in turns according to the operation schedule as shown in FIG. 7.

For example, in case the first heat accumulator module 19 effects ice-thawing operation, the first flow regulation valves 23 of the first heat accumulator module 19 are closed and the first flow regulation valves 23 of the remaining heat accumulator modules 20 to 22 are opened. Further, the second flow regulation valves 24 of the first heat accumulator module 19 are opened and the remaining second flow regulation valves 24 are closed. A series of valve switching operation are effected in turn from the first heat accumulator module 19 to the fourth heat accumulator module 22, whereby a gas turbine intake air cooling operation can be executed for three hours. In this embodiment, the first to fourth heat accumulator modules 19 to 22 are changed over to operate in turn, however, any switching order of the operation of the heat accumulator modules 19 to 22 can be taken.

According to this embodiment, irrespective of each heat accumulator module operating ice-making or thawing, the ice-making and thawing are effected at the same time as a whole heat accumulator 8a, so that a lot of the second heat medium can be treated (served for heat exchanging). Further, accumulation and dissipation of cold can be carried out according to an amount of cold required for the intake air cooler 10.

According to the present invention, the apparatus for cooling gas turbine intake air with LNG can prevent the heat medium or heat mediums directly or indirectly cooling the gas turbine intake air from being frozen, so that the LNG cold energy can be safely and effectively used to cool the gas turbine intake air. Further, even in summer when atmospheric temperature is high, power can be supplied stably without lowering its power generation efficiency.

Further, an ice-making operation and an ice thawing operation can be carried out in the heat accumulator at the same time and a large portion of the heat medium can be treated. The ice-making and ice thawing can be executed according to an amount of cold required for the intake air cooler to cool the air.

What is claimed is:

1. Apparatus for cooling intake air to be taken in by a gas turbine using cold energy of a fuel for the gas turbine, comprising:

a heat exchanger for transferring cold energy of the fuel to a heat medium through an intermediate heat medium having a solidifying point lower than the fuel; and a cooling system, fluidly connected to said heat medium and including an intake air cooler for cooling intake air to be taken into the gas turbine with cold energy of said heat medium.

2. Apparatus according to claim 1, wherein said heat exchanger has a pressure controller for controlling the pressure of said intermediate heat medium so as to keep said intermediate heat medium to a higher temperature than a solidifying point of said heat medium.

3. Apparatus for cooling intake air to be taken in by a gas turbine, using cold energy of a fuel for the gas turbine, said apparatus comprising:

a heat exchanger, having an intermediate heat medium and fluidly connected to both of a fuel tank and a heat medium, for transmitting cold energy of the fuel to said heat medium through said intermediate heat medium, said intermediate heat medium having a lower solidifying point than the fuel and having a property of being vaporizable by said heat medium; and an intake air cooling system, fluidly connected to said heat medium and including an intake air cooler for cooling intake air to be taken into the gas turbine with cold energy of said heat medium.

4. Apparatus according to claim 3, wherein said intermediate heat medium has a property of being condensable by the cold energy of the fuel and vaporizable by said heat medium.

5. Apparatus for cooling intake air to be taken in by a gas turbine, using cold energy of a fuel for the gas turbine, said apparatus comprising:

a heat exchanger for transmitting the cold energy of the fuel to a heat medium through an intermediate heat medium which condenses by the cold energy of said fuel and vaporizes by heat transmitted from said heat medium, said intermediate heat medium having a lower solidifying point than the fuel; and an intake air cooling system, fluidly connected to said heat medium for cooling intake air to be introduced into the gas turbine, using cold energy of said heat medium.

6. Apparatus according to claim 5, wherein said intake air cooling system comprises a heat accumulator for accumulating therein cold energy of said heat medium and an intake air cooler for cooling the intake air with the cold energy of said heat medium accumulated in said accumulator.

7. Apparatus according to claim 6, wherein said heat exchanger has said intermediate heat medium contained therein and a part of a fuel line arranged in said heat exchanger so as to contact with said intermediate heat medium of gas phase, said heat medium is contained in a recirculation line arranged so as to contact with said intermediate heat medium of liquid phase in said heat exchanger and with a heat medium in said heat accumulator.

8. Apparatus according to claim 6, wherein said heat medium is brine and said further heat medium is water.

9. Apparatus for cooling intake air to be taken in by a gas turbine, using cold energy of a fuel for the gas turbine, comprising:

a heat exchanger for transmitting the cold energy of the fuel to a first heat medium through an intermediate heat medium which has a lower solidifying point than the fuel and which is condensed by the cold energy of the fuel and vaporized by heat transmitted from said first heat medium;

a heat accumulator for transmitting cold energy of said first heat medium to a second heat medium to accumulate cold energy in said second heat medium; and an intake air cooler for transmitting the cold energy of said second heat medium to intake air that is introduced into the gas turbine.

10. Apparatus according to claim 9, further comprising:

a first recirculation line for recirculating said first heat medium between said heat exchanger and said heat accumulator; and a second recirculation line for recirculating said second heat medium between said heat accumulator and said intake air cooler to cool the intake air for the gas turbine.

11. Apparatus for cooling intake air to be taken in by a gas turbine using cold energy of a fuel for the gas turbine, comprising:

beat exchange means for transmitting cold energy of the fuel to a first heat medium through an intermediate heat medium having a lower solidifying point than the fuel and having a property of being vaporizable by said first heat medium;

a heat accumulator containing therein a second heat medium;

a first recirculation means for recirculating said first heat medium to transmit and accumulate cold energy of said first heat medium in said second heat medium; and a second recirculation means for recirculating said second heat medium to cool the intake air for the gas turbine.

12. Apparatus for cooling intake air to be taken in by a gas turbine using cold energy of a fuel for the gas turbine, comprising:

a first heat exchanger for transmitting cold energy of the fuel to a first heat medium through an intermediate heat medium having a lower solidifying point than the fuel and having a property of being vaporizable by said first heat medium;

a second heat exchanger for transmitting cold energy of said first heat medium to a second heat medium;

a first recirculation means for recirculating said first heat medium between said first heat exchanger and said second heat exchanger;

an intake air cooler for transmitting cold energy of said second heat medium to intake air to be taken in by the gas turbine; and a second recirculation means for recirculating said second heat medium between said second heat exchanger and said intake air cooler to cool the intake air for the gas turbine.

13. Apparatus for cooling intake air to be taken in by a gas turbine using cold energy of a fuel for the gas turbine, comprising:

a heat exchanger for exchanging heat between cold energy of the fuel and a heat medium through an intermediate heat medium having a solidifying point lower than the fuel;

a pressure controller for controlling the pressure of said intermediate heat medium so as to keep said intermediate heat medium at a higher temperature than a solidifying point of said heat medium; and a cooling system, fluidly connected to said heat medium and including an intake air cooler for cooling intake air to be taken into the gas turbine with cold energy of said heat medium.

14. Apparatus according to claim 13, wherein said cooling system comprises an intake air cooler for cooling the intake air with a further heat medium, a heat accumulator containing therein said further heat medium for accumulating cold energy of said heat medium in said further heat medium, and a recirculation line for recirculating said heat medium between said heat exchanger and said heat accumulator.

15. Apparatus for cooling intake air to be taken in by a gas turbine using cold energy of a fuel for the gas turbine, comprising:

a heat exchanger, containing therein an intermediate heat medium having a solidifying point lower than the fuel, for transmitting cold energy of the fuel to a heat medium through said intermediate heat medium;

a recirculation line for recirculating said heat medium to use cold energy of said heat medium as a cold energy source for cooling the intake air; and a pressure controller for controlling the pressure inside said heat exchanger so that said intermediate heat medium has a gas phase and a liquid phase separated from each other, and a part of said intermediate heat medium of liquid phase is vaporized by said heat medium and a part of said intermediate heat medium of gas phase is condensed by the fuel.

* * * * *